United States Patent
Kluesing et al.

(10) Patent No.: US 9,952,753 B2
(45) Date of Patent: Apr. 24, 2018

(54) PREDICTIVE CACHING AND FETCH PRIORITY

(71) Applicant: Dropbox, Inc., San Francisco, CA (US)

(72) Inventors: Daniel Kluesing, San Francisco, CA (US); Rasmus Andersson, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/694,722

(22) Filed: Sep. 1, 2017

(65) Prior Publication Data

US 2017/0364245 A1    Dec. 21, 2017

Related U.S. Application Data

(63) Continuation of application No. 15/214,873, filed on Jul. 20, 2016, now Pat. No. 9,766,791, which is a continuation of application No. 14/148,119, filed on Jan. 6, 2014, now Pat. No. 9,411,814.

(51) Int. Cl.
| | |
|---|---|
| *G06F 12/08* | (2016.01) |
| *G06F 3/0484* | (2013.01) |
| *G06F 12/0888* | (2016.01) |
| *G06F 12/0862* | (2016.01) |
| *G06F 17/30* | (2006.01) |

(52) U.S. Cl.
CPC ...... *G06F 3/04842* (2013.01); *G06F 12/0862* (2013.01); *G06F 12/0888* (2013.01); *G06F 17/30132* (2013.01); *G06F 2212/602* (2013.01); *G06F 2212/6026* (2013.01)

(58) Field of Classification Search
CPC ............. G06F 3/04842; G06F 12/0888; G06F 12/0862; G06F 17/30132; G06F 2212/0626; G06F 2212/602
See application file for complete search history.

(56) References Cited

U.S. PATENT DOCUMENTS

| | | | |
|---|---|---|---|
| 6,832,102 B2 | 12/2004 | I'Anson | |
| 7,664,870 B2 | 2/2010 | Baek et al. | |
| 8,086,691 B2 | 12/2011 | Viger et al. | |
| 8,676,901 B1 | 3/2014 | Nicolaou et al. | |
| 9,020,890 B2 | 4/2015 | Kottomtharayil et al. | |
| 2002/0083160 A1 | 6/2002 | Middleton | |
| 2002/0174189 A1* | 11/2002 | Peng | ........ H04L 29/06 709/217 |
| 2002/0194612 A1 | 12/2002 | Lundberg et al. | |
| 2004/0224675 A1 | 11/2004 | Puskoor et al. | |
| 2008/0270379 A1 | 10/2008 | Ramakrishna | |
| 2009/0049475 A1 | 2/2009 | Green | |
| 2009/0073266 A1 | 3/2009 | Abdellaziz Trimeche | |
| 2009/0100483 A1* | 4/2009 | McDowell | ........ G06F 9/4443 725/109 |
| 2009/0316778 A1 | 12/2009 | Kim et al. | |

(Continued)

*Primary Examiner* — Hiep Nguyen
(74) *Attorney, Agent, or Firm* — Polsinelli PC

(57) ABSTRACT

Predicting what content items a user finds important and sending those items to a cache on the user's device at times when doing so will not drain resources and will not result in expensive data rates. Applying a ranking function that examines recency and other content metadata associated with the user's content items stored in a synchronized content management system. Determining how much of a ranked list of content items to cache and deciding when is a good time to send content items to the local cache.

20 Claims, 8 Drawing Sheets

(56) References Cited

U.S. PATENT DOCUMENTS

| | | |
|---|---|---|
| 2010/0082397 A1 | 4/2010 | Blegen |
| 2012/0023190 A1 | 1/2012 | Backholm et al. |
| 2012/0124295 A1* | 5/2012 | Humlicek ............ G06F 12/0646 |
| | | 711/136 |
| 2012/0220272 A1 | 8/2012 | Husney |
| 2012/0323868 A1 | 12/2012 | Robbin et al. |
| 2013/0036135 A1 | 2/2013 | Brockey et al. |
| 2014/0223423 A1 | 8/2014 | Alsina et al. |
| 2015/0039678 A1 | 2/2015 | Bilinski et al. |
| 2015/0156609 A1 | 6/2015 | Davis et al. |

* cited by examiner

PREDICTIVE CACHING AND FETCH PRIORITY

CROSS-REFERENCE TO RELATED APPLICATIONS

This application is a continuation of U.S. patent application Ser. No. 15/214,873, filed on Jul. 20, 2016, now U.S. Pat. No. 9,766,791, entitled, "PREDICTIVE CACHING AND FETCH PRIORITY", which is a continuation of U.S. patent application Ser. No. 14/148,119, filed on Jan. 6, 2014, now U.S. Pat. No. 9,411,814, entitled, "PREDICTIVE CACHING AND FETCH PRIORITY"; both of which are hereby expressly incorporated herein by reference in their entireties.

TECHNICAL FIELD

The present technology pertains to storing content, and more specifically pertains to caching content that is stored in a content management system.

BACKGROUND

A traditional paradigm for storing digital content involves storing content locally on the electronic device; however, as the user builds a collection of content items and storing it locally, the amount of free storage decreases. A content management system can also be used to synchronize content items between electronic devices; however, frequent synchronization can involve limited or nonexistent access, can drain computing resources, consume network bandwidth, and can involve a financial obligation when data transfer is charged as a commodity. Similarly, storing a large collection of content in a content management system rather than locally to avoid local storage limitations does not adequately address the problems associated with limited or nonexistent access, the consumption resources, or data rates.

Therefore, what is needed are techniques for reliably giving users quick access to content items that are important to them without draining computer resources.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for reliably giving users quick access to content items that are important to them without draining computer resources. The disclosed technology can predict what content items a user finds important and can send those items to a cache on the user's device at times when doing so will not drain resources and will not result in expensive data rates.

Predicting what items a user will want locally cached can involve applying a ranking function to all of the user's content items stored in a synchronized content management system. The ranking function can involve a score that is generated based on the recency of the content items being opened, shared, edited, emailed, etc. The ranking function can involve a plurality of variables including whether a user explicitly states that a content item is important, how frequently a content item is modified, whether the content item is also stored in a lower resolution, etc.

Additionally, the disclosed technology can base how much of the content should be cached on the user's device based on how much free space is available on the device and using only a portion of the free space. The most important content items, i.e. the top of the ranked list, can be selected until the point where adding a new content item would exceed the allocated portion of free space.

Similarly, the disclosed technology can involve deciding when is a good time to send content items to the local cache. This can involve examining a device's stamina, e.g. free space, battery life, hardware profile, network conditions, whether data transfer will involve data rates, etc. Depending on the state of the device's stamina, the technology can establish and dynamically adjust when and how content items are sent to the local cache.

The disclosed technology also involves user interface elements for simple navigation in a system that predicts what content items a user finds important and send those items to a cache on the user's device at times when doing so will not drain resources and will not result in expensive data rates.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for techniques for reliably giving users quick access to content items that are important to them without draining computing resources. The disclosed technology makes it fast and simple to find content items that are important to a user. More specifically, he disclosed technology can predict what content items that a user finds important and can send those items to a cache on the user's device at times when doing so will not drain resources and will not result in expensive data rates. This can be particularly useful if traveling to a region with expensive data rates or lack connectivity.

Figure 1:
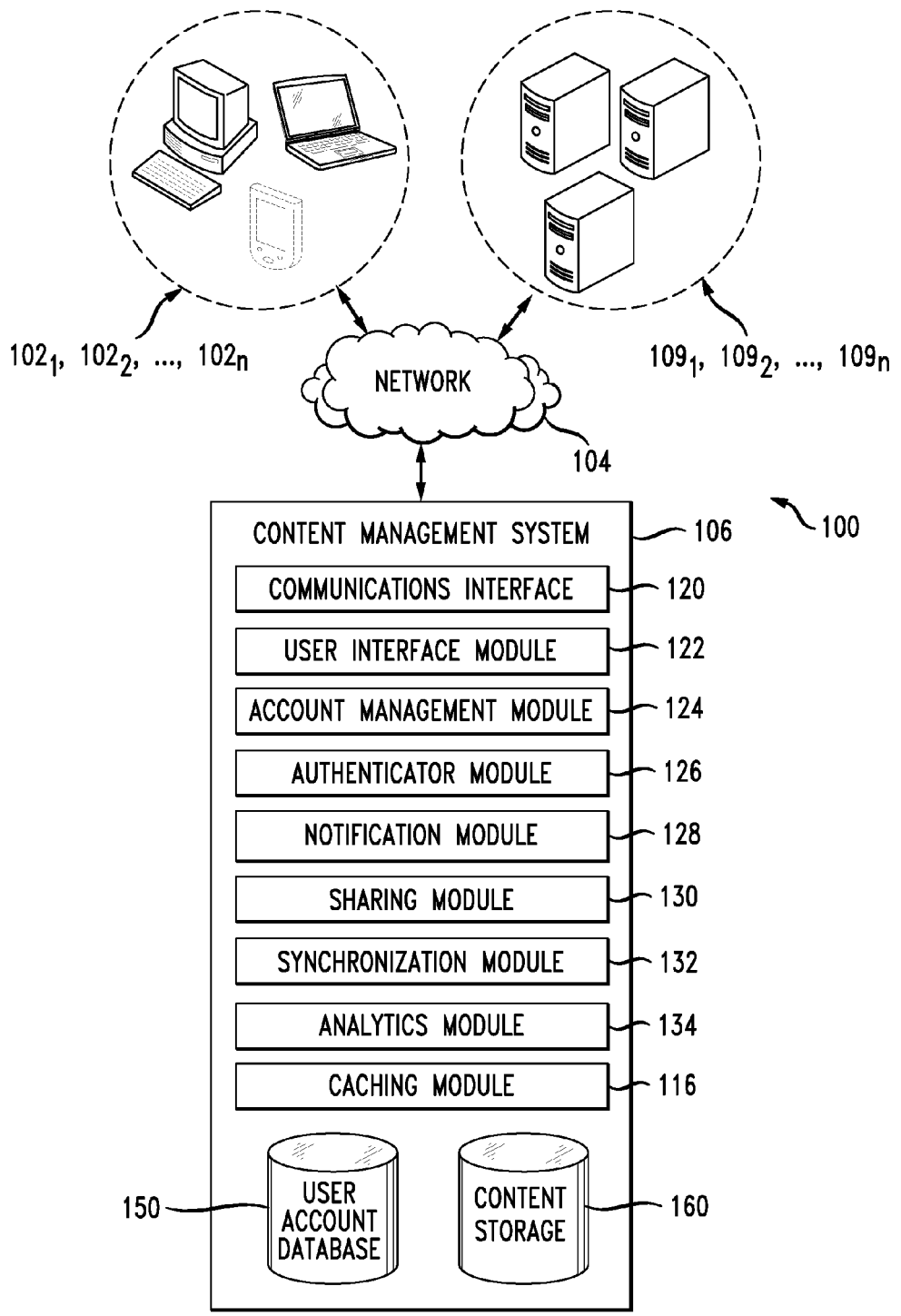
FIG. 1 shows an exemplary configuration of devices and a network in accordance with the invention.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content.

Content management system 106 can include caching module 116 that sends content to be cached in client device 102. The content can be that which a user accesses frequently, indicates as a 'favorite', or that it otherwise important. This content can be cached on client device 102.

Caching module 116 can prioritize a list of content items stored for a user and can automatically send a subset of the content items representing high-priority content items to client 102 for caching. Caching module 116 can determine high-priority content items by generating a scaling factor for all of the content items stored for a user and selecting a subset of content items having a threshold scaling factor.

Additionally, caching module 116 can use information about client device 102 to decide when and how much content to cache. For example, caching module can use information about client's 102 battery life, free space, hardware capabilities, network connection type, cost associated with connection over a network, etc. to determine when and how to cache content items.

Also, content can be cached on client device 102 in one or more representation quality levels. For example, a thumbnail version of a high-resolution image can be cached on client device 102 and, when selected, can be displayed while retrieving the full-resolution image from content management system 106.

Prioritization of the list of content items stored for a user in a synchronized content management system, selection of a subset of content items, determination of device 102 stamina, and other caching techniques are explained in greater detail below.

Additionally, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$. Depending on the circumstances, content can be cached on the same client device $102_i$, other client device $102_j$, both the same client device $102_i$ and the other client device $102_j$, or neither.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true.

A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

As explained above, content management system 106 can include caching module 116 that generates a prioritized list of content items and automatically sends a subset of content items that represent high-priority content items to client 102 for caching. In some embodiments of the disclosed technology, generation of the prioritized list involves generating a scaling factor based on metadata associated content items and for all of the content items stored in content management system 106.

Caching module 116 can also assign metadata values to content items. Some embodiments of the disclosed technology involve caching module 116 assigning content items with a File Score and dynamically maintaining the File Score for the content items as it changes due to user interaction with caching module 116. The File Score can be an estimate of the probability that the user will want to access each particular content item on their client device 102. For example, content management system 106 can create a File Score based on the recency of a group of events.

In some embodiments of the disclosed technology, creating a File Score based on recency can involve examining a last-opened or last-modified metadata value. In some other embodiments, caching module 116 can examine multiple more-detailed recency-related metadata values, weight each value, and generate a File Score. For example, caching module 116 can create a File Score by examining and weighting metadata values relating to how recently the item was opened from an interface from content management system 106, how recently the item was opened in another application, how recently the item was shared by a user of client device 102, how recently the content item was shared to a user of client device 102, how recently the content item was shared by a user of client device 102 via another device, how recently the content item was edited by the user of client device 102, how recently the content item was opened by a user of client device 102 via another non-mobile device, etc.

In addition to generating a priority list of content items to cache on client device 102, caching module 116 can also carry out a Caching Strategy. A caching strategy can involve determining when and how much content to send to client device 102 for caching based on a condition of client device 102. In some embodiments of the disclosed technology, caching strategy can involve examining an amount of free memory space available in client 120 to define how much of that free space should be used to cache content items from content management system 106 and, consequently, which top items from the priority list should be sent to client device 102.

In some embodiments, caching module uses a predetermined percentage of client device's 102 total free space. For example, caching module 116 can use the higher of twenty percent of free space on client device 102 or one hundred megabyte. As the user of client device 102 adds or deletes data from client device 102, this percentage will change to accommodate a larger or smaller cache and content items are evicted or fetched accordingly. In some embodiments, a time-based smoothing function is applied when content is fetched or evicted to prevent thrashing and poor system performance.

Caching strategy can also involve determining client device's 120 ability to inexpensively download, store, and process the caching of content items. This ability, also referred to as "Client Device Stamina", is discussed in greater detail below.

When using a caching strategy tied to device free space, different devices will have different cache sizes based on the device's spefications and usages. Accordingly, basing a caching strategy on free space in client device 102 can encourage platform agnosticism. This is because the caching module 116 can maintain a global priority list of content items (e.g. by using File Score), receive a request from any client device 102, independent of its specifications, and cache content items to only fill a portion of client device 102 so as not to unreasonably degrade client device stamina.

Figure 2:
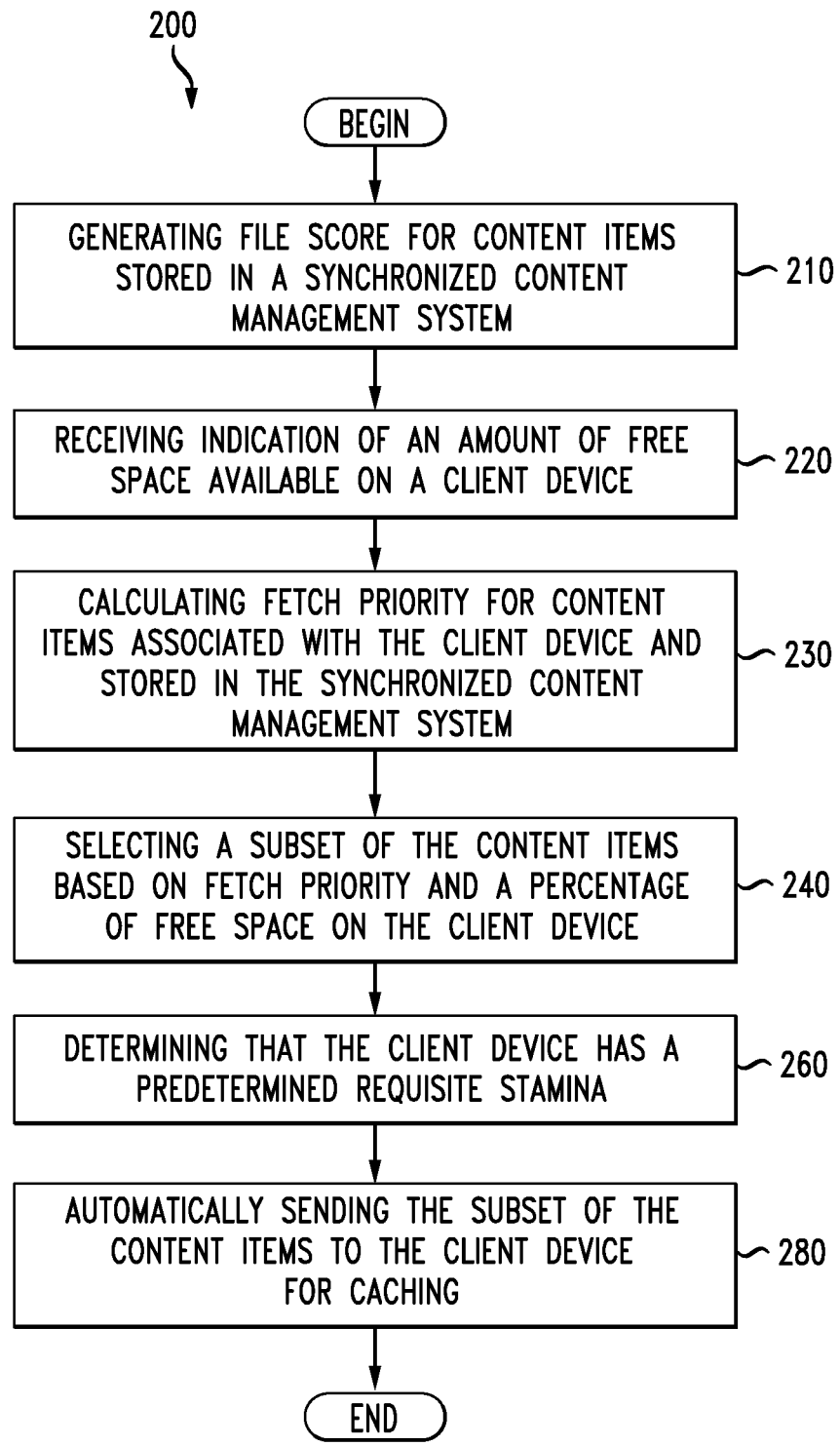
FIG. 2 shows an exemplary method of selecting content items to send to a client device for caching according to some embodiments of the disclosed technology.

FIG. 2 shows method 200 of selecting content items to send to a client device for caching according to some embodiments of the disclosed technology. Method 200 involves generating a File Score for all content items stored in a synchronized content management system at block 210 and receiving information from a client device indicating an amount of free space available on the client device at block 220.

Next, method 200 involves calculating Fetch Priority for content items that are associated with the client device and that are stored in the synchronized content management system at block 230. Fetch Priority is score given to all content items associated with a particular user account in an attempt to hypothesize that content the user wants cached on a client device associated with that user account.

While the File Score is a global value that can be based on a more narrow set of metadata (e.g. recency-related metadata), Fetch Priority is value individually tailored to form strategy for providing content items on a per-device basis. Indeed, in some embodiments of the disclosed technology, the File Score is a factor in calculating Fetch Priority. Client Device Stamina and other variables can be used in a Fetch Priority calculation and are explained in greater detail below.

After calculating Fetch Priority, method 200 involves selecting a subset of the content items based on Fetch Priority and a percentage of the free space in the client device available for caching content items stored in the synchronized content management system. Selecting a subset of content items can involve generating a ranked list of content items based on Fetch Priority and selecting content items from the list with higher Fetch Priority values until the amount of free space for caching is full. Additionally, selecting a subset of content items can involve adding content items explicitly requested in the user account.

Some embodiments of the disclosed technology involve storing multiple varying quality representations of content items that have been previously transcoded or transcoding content items into one or more varying quality representations and storing them. Fetch priority can be for each of the representations and its definition can be weighted to encourage caching of a lower quality representation in lieu of or in preemption to a higher quality representation.

Once a subset of content items is selected, method 200 involves determining that the client device has adequate client stamina (explained below) at block 260 and automatically sending the subset of content items to the client device for caching at block 280.

Although specific steps are shown in FIG. 2, in other embodiments the method can have more or fewer steps.

As explained above, a Fetch Priority calculation can use a number of factors for individually tailoring a strategy for caching content items on a per-device basis. The following exemplary factors can be used:

File Size: the size of the content item;

Pinned Importance: a value representing whether or not or representing a degree to which a user explicitly marks a content item as subjectively important, as a favorite item, etc;

File Score: a score maintained by the content management system (as explained above);

Sync Score: a value representing how frequently a content item is changed in the content management system; and Representation Quality: a percentage describing the degree of quality of the content item when compared to an original (e.g. a thumbnail representation of a photo can have a lower Representation Quality percentage).

The various factors in a Fetch Priority calculation can also be weighted and factored in algorithms that attempt to guess how a user might prefer content items that are cached in a client device.

In some embodiments, the Fetch Priority value is defined as:

$$\text{Fetch Priority} = (\text{Pinned Importance} * \text{Weight Given to Pinned Importance}) + (\text{File Score} * \text{Weight Given to File Score}) + ((1/\text{Representation Quality}) + \text{Weight Given to File Size}) - (\text{Sync Score}).$$

Using this function, the Weight Given to Pinned Importance can be set to ensure that content items that are pinned as important, favorite, etc. are ensured a place in the cache. Likewise, Sync Score can be set to a value such that only files with a positive Fetch Priority value should be cached.

Figure 3:
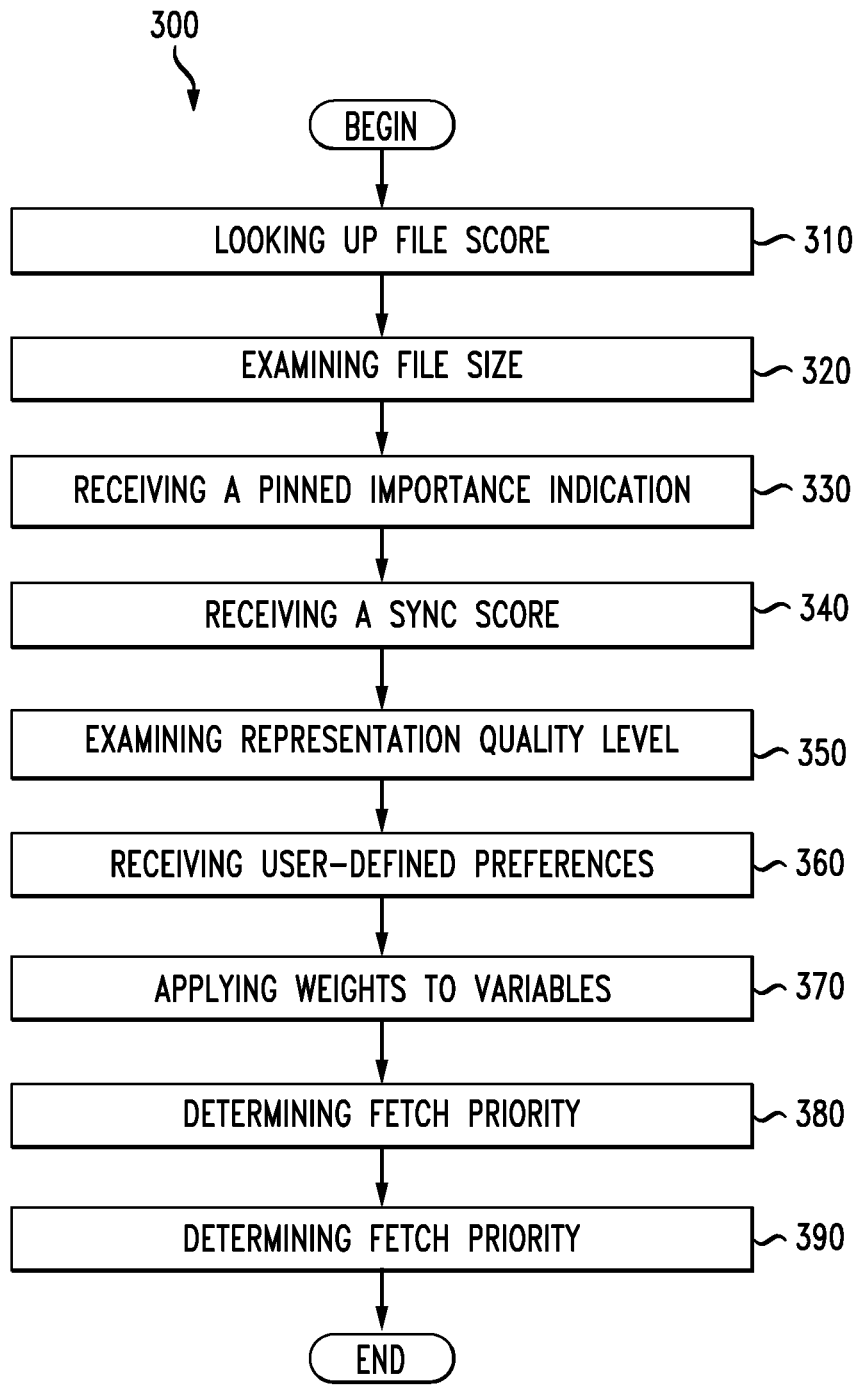
FIG. 3 shows an exemplary method of calculating a fetch priority for content items according to some embodiments of the disclosed technology.

FIG. 3 shows method 300 of calculating a fetch priority for content items according to some embodiments of the disclosed technology. Method 300 involves looking up the File Score of a content item at block 310, examining the file size of the content item at block 320, receiving a Pinned Importance indication at block 330, and receiving a Sync Score at block 340.

Method 300 also involves examining the Representation Quality level of a content item at block 350. As explained above, a content item can be stored (or transcoded and stored) in a synchronized content management system in a plurality of Representation Quality levels and the varying-quality versions content item can have different Fetch Priority values. Therefore, so long as the other variables cause the Fetch Priority function to rank more than one varying-quality version of the same content item high enough, the more than one version can be cached on a client device.

Method 300 also involves receiving user-defined preferences at block 360, the user-defined preferences relating to which content items are cached, how content items are cached, when content items are cached, etc.

In addition, Fetch Priority can be calculated by using rules put into place by an operator of the content management system. For example, the content management system can enforce rules that promote higher Fetch Priority values for a particular content item type, e.g. camera uploads. Similarly, the content management system can enforce maximum size limits to disallow large sized content items, e.g. over five hundred megabytes.

Next, method 300 involves applying weights to the above received and examined variables at block 370 and calculating a Fetch Priority based on a weight at block 380 and the Fetch Priority result is modified per the user-defined preferences at block 390.

Although specific steps are shown in FIG. 3, in other embodiments the method can have more or fewer steps.

Figure 4A:
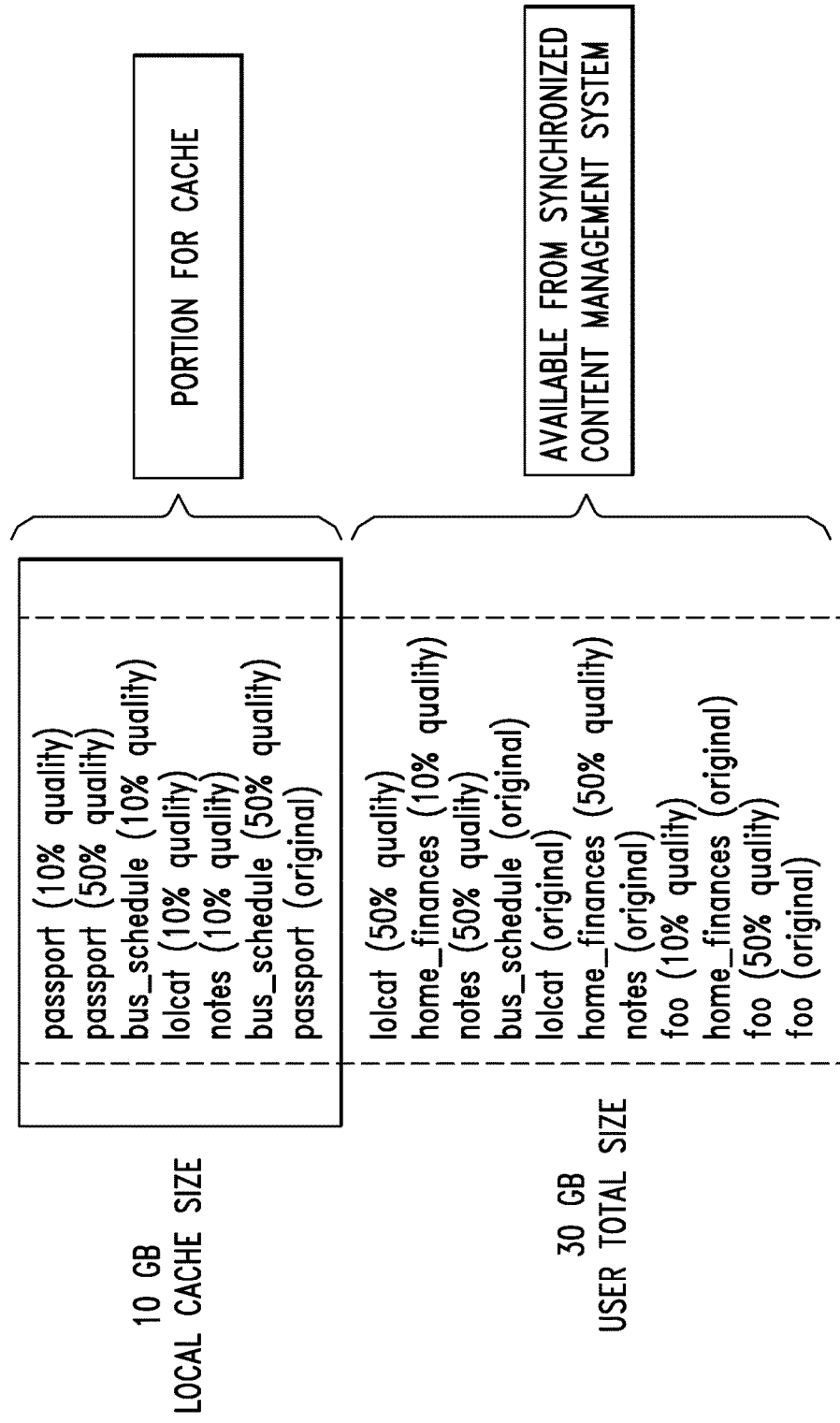
FIG. 4A shows a representation of a ranked list of content items according to some embodiments of the disclosed technology.

FIG. 4A shows a representation of a ranked list of content items according to some embodiments of the disclosed technology. Items are ranked based on Fetch Priority with the more highly prioritized content items on the top of the list. One quarter (ten gigabytes) of client device free space is dedicated to cache content items from a synchronized content management system. Accordingly the portion of the ranked list for the cache is less than or equal to ten gigabytes whereas the same portion plus the next ranked content items exceeds ten gigabytes. The remaining portion is not cached, but remains available from a synchronized content management system.

Figure 4B:
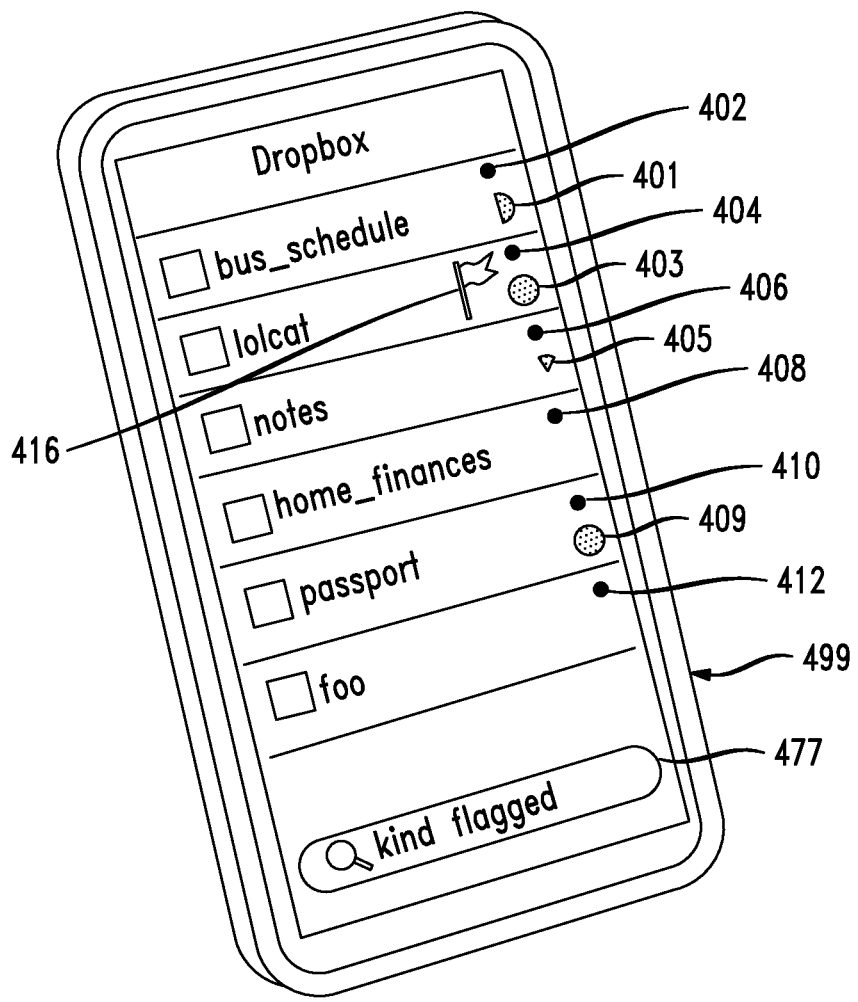
FIG. 4B shows an exemplary user interface for displaying content items that are stored in a synchronized content management system to a user.

FIG. 4B shows an exemplary user interface 499 for displaying content items that are stored in a synchronized content management system to a user. Individual interface elements 402, 404, 406, 408, 410, 412 can be used to access content items. Also, the individual interface elements 402, 404, 406, 408, 410, 412 can each include an indicator 401, 403, 405, 409 to indicate the maximum quality level for the content items that are cached on a device. For example, a filled circle indicator 409 can indicate a full one-hundred percent quality representation of content item 410 is cached, a half filled indicator 401 can indicate a fifty-percent quality representation of content item 402 is cached, less-than half filled indicator 405 can indicate a less than fifty-percent quality representation of content item 406 is cached, and the absence of an indicator can indicate that content items 408, 412 are not cached.

Content elements represented by interface elements 402, 406, 410 are cached due to their having a high Fetch Priority and their being in the top of the ranked list of FIG. 4A. However, as explained above, Fetch Priority can be influenced by Pinned Importance with a user explicitly marking a content item as important. Indeed, the Fetch Priority ranked list of FIG. 4A can change after a user marks a content item represented by interface element 404 as important. Likewise, user interface 499 can include flag interface element 416 to show that the content item was marked as important and can include a filled circle indicator 403 to indicate a full one-hundred percent quality representation of the content item marked as important is cached when it might not otherwise be cached or when it might otherwise be cached at a lower quality representation.

Additionally, user interface 499 can include searching interface 477 that can expose search hints, such as "kind: flagged" which a user can use to search for content items that has been marked as subjectively important. While a "kind: flagged" search hint is shown in FIG. 4B, those with ordinary skill in the art having the benefit of this disclosure will readily understand that a wide variety other content item kinds can be searched with searching interface 477, such as "kind:Word", "kind:powerpoint", "kind:photo", "kind: video", etc.

After identifying content items to cache, a device can download and cache the content items according to dynamic schedule and at a dynamic fetch rate. Indeed, the dynamic schedule and dynamic fetch rate can be tied to a device stamina value.

For example, the dynamic schedule can involve determining whether the device is connected to the synchronized content management system via an adequate network connection that does not incur data rates. Likewise, the dynamic fetch rate can involve determining whether the device has a predetermined threshold battery level before initiating a download for another content item to be cached.

Figure 5:
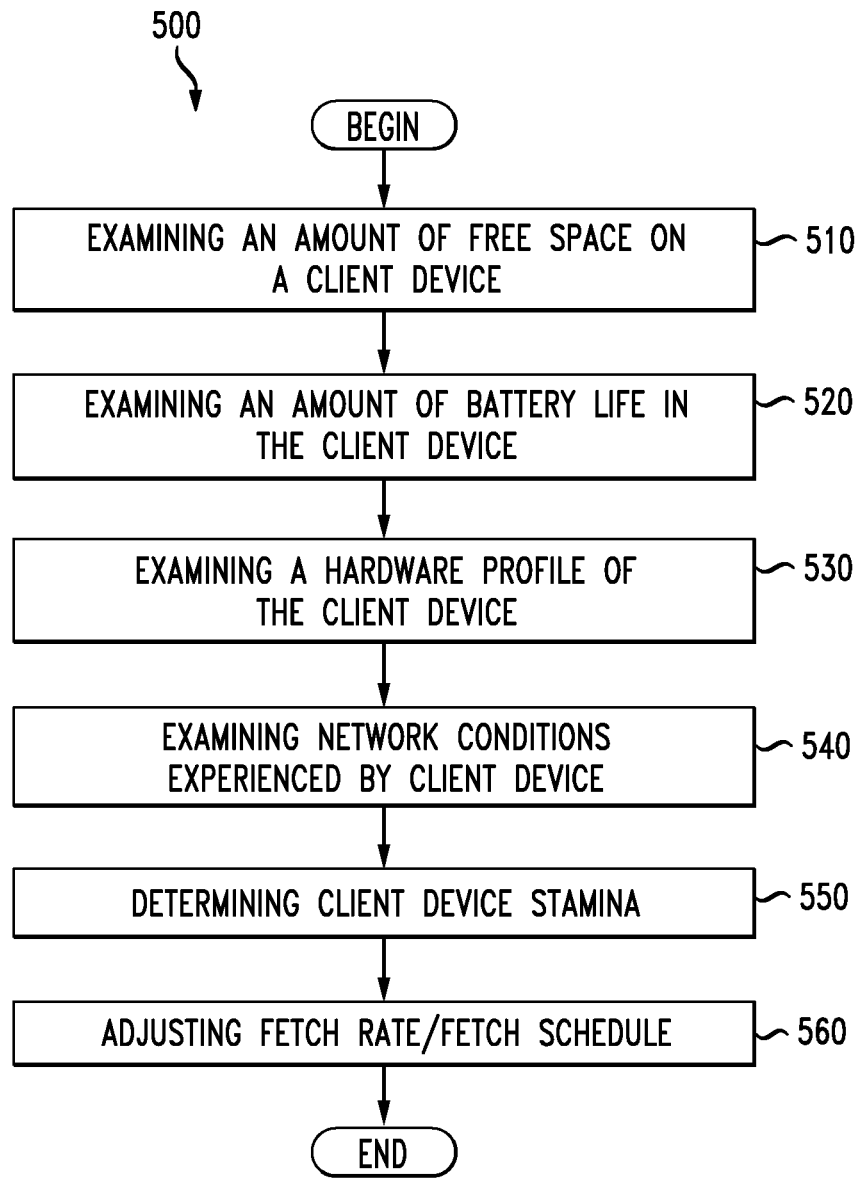
FIG. 5 shows an exemplary method of adjusting a fetch rate and fetch schedule for requesting items to be cached from a synchronized content management system based on a client device stamina.

FIG. 5 shows method 500 of adjusting a fetch rate and fetch schedule for requesting items to be cached from a synchronized content management system based on a client device stamina according to some embodiments of the disclosed technology.

Method 500 involves examining an amount of free space on a client device at block 510, examining amount of battery life remaining on the client device at block 520, examining a hardware profile (e.g. processing power, RAM, etc.) of the client device at block 530, examining network conditions experienced by the client device at block 540.

Using the examined variables, method 500 determines the Client Device Stamina at block 550 and adjusts the Fetch Rate and Fetch Schedule based on the Client Device Stamina at block 560. Although specific steps are shown in FIG. 5, in other embodiments the method can have more or fewer steps.

A static approach to Fetch Rate/Fetch Schedule can cause problems during certain events. For example, when a new device makes an initial link with synchronized content management system, its free space can be very large. Also, if the user of the device has a large number of content items existing already in the synchronized content management system then a large amount of content items will be transmitted to the device and cached locally thereon. Without modifying the Fetch Rate/Fetch Schedule, the device's stamina could drain very quickly. Accordingly, some embodiments of the disclosed technology involve a technique for adjusting Fetch Rate/Fetch Schedule that can be applied when an initial link to the synchronized content management system is first made. The technique involves temporarily setting the portion of available free space for caching very low and growing it over time. During this ramp up, if the device has a predetermined requisite stamina (e.g. plugged in to power, battery life greater than eighty percent, connected to wifi) then the adjusted technique can be replaced by a more aggressive caching technique can be put into place so long as the requisite stamina remains in place.

Figure 6A:
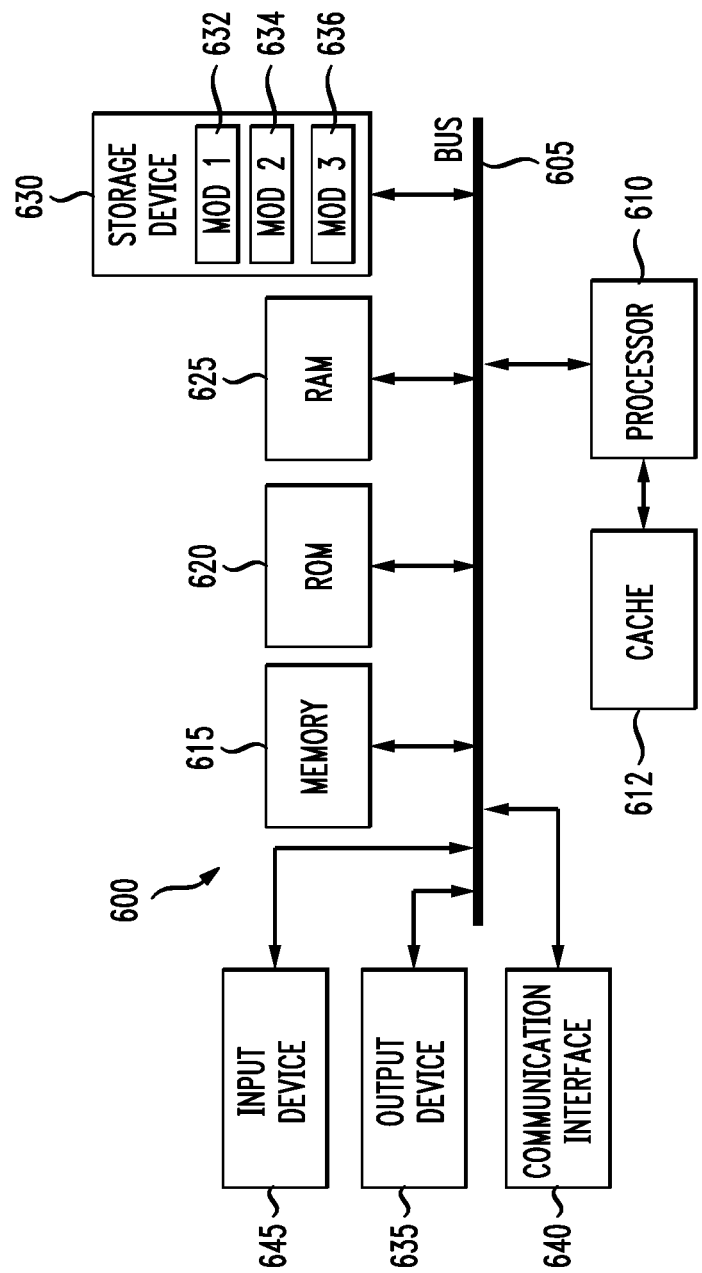
FIG. 6A shows an exemplary possible system embodiment for implementing various embodiments of the present technology.

FIGS. 6A and. 6B show exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

Figure 6B:
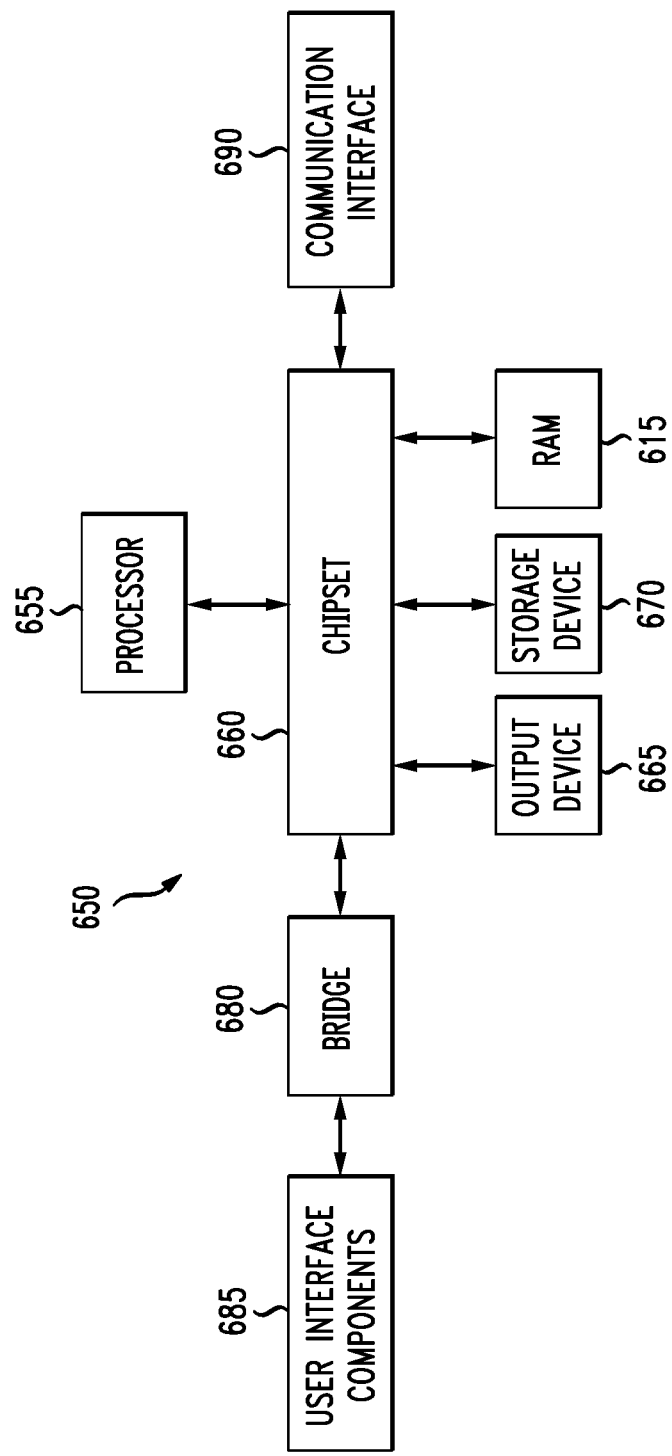
FIG. 6B shows an exemplary possible system embodiment for implementing various embodiments of the present technology.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, from a client device authorized on a user account of a content management system, an amount of free memory space available on the client device for caching one or more content items associated with the user account;
defining a subset of the amount of free memory space available to use for caching the one or more content items;
selecting a subset of content items from the one or more content items associated with the user account based on the subset of the amount of free memory space on the client device;
increasing the defined subset of the amount of free memory space to use for caching based on a measured stamina of the client device; and
selecting a further subset of content items from the one or more content items associated with the user account based on the increased defined subset of the amount of free memory space.

2. The method of claim 1, wherein selecting a subset of content items from the content items associated with the user account comprises:
generating a ranked list of content items from the content items associated with the user account based on a generated Fetch Priority score, wherein a content item with a higher Fetch Priority score has a higher rank in the ranked list; and
selecting one or more content items from the ranked list beginning with higher ranked content items until an amount of space required to cache the selected content items fills the subset of the amount of available caching space.

3. The method of claim 1 wherein the measured stamina includes battery life, hardware profile, and network conditions.

4. The method of claim 1, wherein the subset of the amount of free space to use for caching is calculated by the content management system based on a predetermined percentage of a total amount of storage space on the client device and the received amount of free memory space available on the client device.

5. The method of claim 1, wherein metadata associated with a content item comprises at least one of a file size, a user indication of importance of a content item, a content management system-wide item score, a score reflecting how likely a content item is to be updated, or a quality score reflecting a quality of a content item compared to an original of the content item.

6. The method of claim 1 further comprising adjusting a fetch rate and fetch schedule based on the measured stamina.

7. The method of claim 6, wherein the measured stamina includes an amount of battery life remaining; and
adjusting the fetch rate and fetch schedule is based on both the amount of battery life remaining and the increased defined subset of the amount of free memory space.

8. The method of claim 1 further comprising:
caching the further subset of content items with the increased defined subset of the amount of free memory space in the client device.

9. The method of claim 8, comprising:
selecting at least one content item that was previously cached to be deleted when a Fetch priority score for a new file or a modified existing file is ranked higher on a ranked list of content items from the at least one content items associated with the user account based on respective Fetch Priority scores of each of the content items.

10. A non-transitory computer-readable medium comprising instructions stored on the computer readable medium that when executed are effective to cause a computing device to:
receive, from a first client device authorized on a user account of a content management system, a first amount of free memory space available on the first client device for caching one or more content items associated with the user account;
define a subset of the first amount of free memory space to use for caching the one or more content items;
select a first subset of content items from the content items associated with the user account based on a first amount of available caching space;
increase the defined subset of the first amount of free memory space to use for caching based on a measured stamina of the first client device; and
select a second subset of content items from the one or more content items associated with the user account based on the increased defined subset of the first amount of free memory space.

11. The non-transitory computer-readable medium of claim 10 further comprising:
receive, from a second client device authorized on the user account of the content management system, a second amount of free memory space available on the second client device for caching one or more content items associated with the user account; and
select a third subset of content items from the content items associated with the user account based on a generated Fetch Priority score and a second amount of available caching space on the first client device.

12. The non-transitory computer-readable medium of claim 10, 1 further comprising adjusting a fetch rate and fetch schedule based on the measured stamina.

13. The non-transitory computer-readable medium of claim 12, wherein the measured stamina includes an amount of battery life remaining; and
adjusting the fetch rate and fetch schedule is based on both the amount of battery life remaining and the increased defined subset of the amount of free memory space.

14. The non-transitory computer-readable medium of claim 10, wherein the subset of the first amount of available caching space is calculated by the content management system based on a predetermined percentage and the received first amount of free memory space available on the first client device and a second amount of available caching space is calculated by the content management system based on the predetermined percentage and a received second amount of free memory space available on a second client device.

15. The non-transitory computer-readable medium of claim 10, wherein selecting a subset of content items from the content items associated with the user account comprises:
generate a ranked list of content items from the content items associated with the user account based on generated Fetch Priority scores, wherein a content item with a higher Fetch Priority score has a higher rank in the ranked list; and select one or more content items from the ranked list beginning with higher ranked content items until an amount of space required to cache the selected content items fills the amount of available caching space.

16. The non-transitory computer-readable medium of claim 10 comprising:

caching the second subset of content items with the increased defined subset of the amount of free memory space in the first client device.

17. The non-transitory computer-readable medium of claim 10, wherein the measured stamina includes battery life, hardware profile, and network conditions.

18. The non-transitory computer-readable medium of claim 10, wherein metadata associated with a content item comprises at least one of a file size, a user indication of importance of a content item, a content management system-wide item score, a score reflecting how likely a content item is to be updated, or a quality score reflecting a quality of a content item compared to an original of the content item.

19. A system comprising:

a first client device having configured to store and synchronize local copies of content items stored on a content management system, the client device having a first amount of available caching space; and the content management system configured to:

receive, from a client device authorized on a user account of the content management system, an amount of free memory space available on the client device for caching one or more content items associated with the user account;

define a subset of the amount of free memory space to use for caching the one or more content items;

select a subset of content items from the one or more content items associated with the user account based on the subset of the amount of free memory space on the client device;

increase the defined subset of the amount of free memory space to use for caching based on a measured stamina of the client device; and select a further subset of content items from the one or more content items associated with the user account based on the increased defined subset of the amount of free memory space.

20. The system of claim 19 further wherein the content management system configured to:

adjust a fetch rate and fetch schedule based on the measured stamina, wherein the measured stamina includes an amount of battery life remaining; and adjusting the fetch rate and fetch schedule is based on both the amount of battery life remaining and the increased defined subset of the amount of free memory space.

* * * * *